United States Patent Office 3,767,661
Patented Oct. 23, 1973

3,767,661
4H-s-TRIAZOLO[4,3-a][1,4]BENZODIAZEPINES
Jackson B. Hester, Jr., Galesburg, Mich., assignor to
The Upjohn Company, Kalamazoo, Mich.
No Drawing. Filed Sept. 13, 1971, Ser. No. 180,111
Int. Cl. C07d 99/02
U.S. Cl. 260—295 T                  3 Claims

ABSTRACT OF THE DISCLOSURE

This invention relates to a novel substituted 4H-s-triazolo[4,3-a][1,4]benzodiazepines embraced by the formula

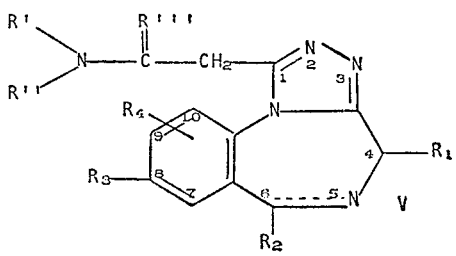

wherein R′ and R″ are selected from the group consisting of hydrogen and alkyl of 1 through 3 carbon atoms, and together

is selected from the group consisting of pyrrolidino, piperidino, hexamethyleneimino and morpholino; R‴ is selected from the group consisting of

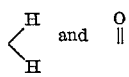

$R_1$ is selected from the group consisting of hydrogen and alkyl of 1 through 3 carbon atoms; $R_2$ is selected from the group consisting of pyridyl, 2-pyrimidyl, furyl, pyrryl, thienyl, lower alkyl of 1 through 3 carbon atoms, lower alkenyl of 2 through 3 carbon atoms, cycloalkyl of 5 through 7 carbon atoms and cycloalkenyl of 5 through 7 carbon atoms; $R_3$ and $R_4$ are selected from the group consisting of hydrogen, halogen, nitro, trifluoromethyl, lower alkoxy of 1 through 3 carbon atoms, lower alkyl-thio of 1 through 3 carbon atoms and lower dialkylamino having lower alkyl moieties of 1 through 3 carbon atoms; the 5(6)-nitrogen-carbon linkage denoted by the broken line is selected from the group consisting of single bonds and double bonds, with the proviso that the linkage is always a double bond whenever R‴ is

and pharmacologically acceptable acid addition salts thereof. It also relates to processes for their preparation. The new products of Formula V are useful as sedatives, hypnotics, anticonvulsants, tranquilizers and muscle relaxants in mammals and birds, and as feed additives for livestock and poultry.

BRIEF SUMMARY OF THE INVENTION

This invention is directed to new benzodiazepines and is particularly concerned with novel 1,6-disubstituted-4H-s-triazolo[4,3-a][1,4]benzodiazepines embraced by Formula V, above, and processes for their production. The 1-substituent here is

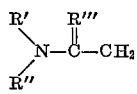

wherein R′ and R″ are selected from the group consisting of hydrogen and alkyl of 1 through 3 carbon atoms, together

is selected from the group consisting of pyrrolidino, piperidino, hexamethyleneimino and morpholino and R‴ is selected from the group consisting of

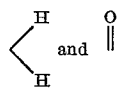

the 6-substituent is selected from the group consisting of pyridyl, 2-pyrimidyl, furyl, pyrryl, thienyl, lower alkyl of 1 through 3 carbon atoms, lower alkenyl of 2 through 3 carbon atoms, cycloalkyl of 5 through 7 carbon atoms and cycloalkenyl of 5 through 7 carbon atoms.

The novel compounds of this invention and processes for their production are represented by the following sequence of formulae

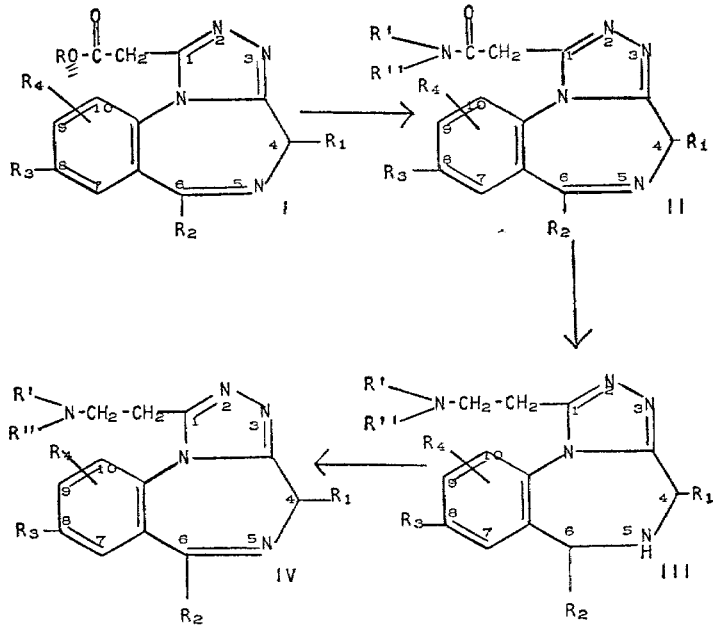

wherein R is alkyl of 1 through 3 carbon atoms; R' and R'' are selected from the group consisting of hydrogen and alkyl of 1 through 3 carbon atoms, and together

is selected from the group consisting of pyrrolidino, piperidino, hexamethyleneimino and morpholino; $R_1$ is selected from the group consisting of hydrogen and alkyl of 1 through 3 carbon atoms; $R_2$ is selected from the group consisting of pyridyl, 2-pyrimidyl, furyl, pyrryl, thienyl, lower alkyl of 1 through 3 carbon atoms, lower alkenyl of 2 through 3 carbon atoms, cycloalkyl of 5 through 7 carbon atoms and cycloalkenyl of 5 through 7 carbon atoms; $R_3$ and $R_4$ are selected from the group consisting of hydrogen, halogen, trifluoromethyl, lower alkoxy of 1 through 3 carbon atoms, lower alkylthio of 1 through 3 carbon atoms and lower dialkylamino having lower alkyl moieties of 1 through 3 carbon atoms; and pharmacologically acceptable acid addition salts thereof.

The new Compounds II, III and IV are included within the generic formula

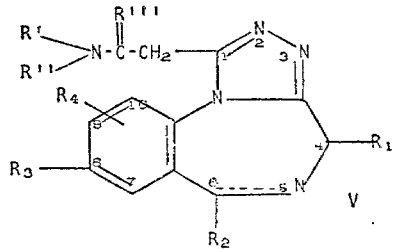

wherein R', R'', R''', $R_1$, $R_2$, $R_3$, $R_4$ and the broken line at the 5(6)-position have the same meaning as above.

Examples of lower alkyl include methyl, ethyl, propyl and isopropyl. Example of lower alkenyl of 2 through 3 carbon atoms include vinyl, 1-propenyl and isopropenyl. Examples of cycloalkyl of 5 through 7 carbon atoms include cyclopentyl, cyclohexyl and cycloheptyl. Examples of cycloalkenyl of 5 through 7 carbon atoms include 1-cyclopentenyl, 1-cyclohexenyl and 1-cycloheptenyl. Examples of halogen include fluoro, chloro, bromo and iodo. Examples of lower alkoxy of 1 through 3 carbon atoms include methoxy, ethoxy, propoxy and isopropoxy. Examples of lower alkylthio of 1 through 3 carbon atoms include methylthio, ethylthio, propylthio and isopropylthio. Examples of lower dialkylamino having lower alkyl moieties of 1 through 3 carbon atoms include dimethylamino, diethylamino, methylethylamino, methylpropylamino, ethylpropylamino, dipropylamino, diisopropylamino, methylisopropylamino and ethylisopropylamino.

The novel compounds of Formula V of this invention are inclusive of their pharmacologically acceptable acid addition salts, e.g., the hydrochlorides, hydrobromides, hydroiodides, sulfates, phosphates, cyclohexanesulfamates, methanesulfonates, and the like, and are prepared by reacting a compound of Formula V with an excess of the selected pharmacologically acceptable acid. The reaction is conveniently carried out in an organic solvent, e.g., ether, dioxane or tetrahydrofuran, and the salts recovered by evaporating the solvent.

The compounds of Formula V in free base form or its acid addition salts can be used as sedatives, hypnotics, anticonvulsants, tranquilizers and muscle relaxants in mammals and birds. Also, as feed additives for increasing growth rate and feed efficiency of livestock. The free base or acid addition salt forms of the compounds of Formula V can be used in treating mammals and birds in the same way that the known muscle relaxants such as diazepam or mephenesin are used, with due regard to appropriate adjustment of dosages to the activities of V.

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like can be used as carriers or for coating purposes. Oil, e.g., coconut oil, sesame oil, safflower oil, cottonseed oil, peanut oil can be used for preparing solutions or suspensions of the active drug. Sweetening, coloring and flavoring agents can be added.

For mammals and birds food premixes, with starch, oatmeal, dried fishmeat, fishmeal, flour and the like can be prepared. As sedatives, hypnotics, anticonvulsants, tranquilizers and muscle relaxants, the compounds of Formula V and their pharmacologically acceptable acid addition salts can be used in dosages of 0.01 mg.–2.0 mg./kg. in oral or injectable preparations. They can be used to alleviate muscle cramps in pets and domestic animals as occur, for example, after strenuous activity; to alleviate tension and anxiety in mammals or birds, e.g., such as occurs in travel. As feed aditives the compounds of Formula V and their pharmacologically acceptable acid addition salts can be used in dosages of 0.003 mg. to 50 mg./animal/day in a feed to increase growth, feed consumption and feed efficiency in livestock and poultry, milk production in mammalian species and egg production in the avian species.

The starting compounds of Formula I are prepared in the manner described in Example 1, the starting materials thereof being prepared as shown in Preparations 1, 2 and 3.

In carrying out the process of this invention a selected 6-substituted - 4H - s - triazolo[4,3-a][1,4]benzodiazepin-1-acetic acid alkyl ester (1) is reacted at between about 25 to about 200° C. with aqueous ammonia or an aqueous solution of a lower dialkylamine in dimethylformamide, dioxane, tetrahydrofuran or the like, or a lower N-heterocyclicamine such as piperidine, pyrrolidine, hexamethyleneimine or morpholine, preferably in a solvent such as dimethylformamide, diethylacetamide or the like, to yield a corresponding N,N-lower dialkyl (or N,N-polymethylene) - 6 - substituted - 4H - s-triazolo[4,3-a][1,4]benzodiazepin-1-acetamide (II), which is recovered and purified by standard methods, e.g., extraction, chromatography and crystallization.

Compound II is reduced, e.g., with borane or an alkali metal aluminum hydride in a solvent (e.g., ether or tetrahydrofuran) at between about 25 to about 80° C., to yield a corresponding 1-{2-[lower dialkyl(or polymethylene)amino]ethyl} - 5,6 - dihydro - 6 - substituted-4H-s-triazolo[4,3-a][1,4]benzodiazepine (III), which is recovered and purified by conventional procedures, such as extraction, chromatography and recrystallization.

Compound III is oxidized, e.g., with activated manganese dioxide (preferably in benzene, tetrahydrofuran or another anhydrous solvent), or ruthenium dioxide (in a solvent such as chloroform or carbon tetrachloride), or 2,3-dichloro-5,6-dicyanobenzoquinone (DDQ) (in a solvent such as benzene or dioxane), or, preferably with diethyl azodicarboxylate (e.g., in benzene), the reaction being carried out at between about 25 to 80° C. for between about 1 to about 18 hours, to yield a corresponding 1-{2-[lower dialkyl(or polymethylene)amino]ethyl}-6-substituted - 4H - s - triazolo[4,3-a][1,4]benzodiazepine (IV), which is recovered and purified by conventional means, e.g., extraction, chromatography and recrystallization.

DETAILED DESCRIPTION OF THE INVENTION

The following preparations and examples are illustrative of the processes and products of the present invention, but are not to be construed as limiting.

PREPARATION 1

7-bromo-1,3-dihydro-5-(2-pyridyl)-2H-1,4-benzodiazepine-2-thione

A stirred solution of 6.53 g. of 7-bromo-1,3-dihydro-5-(2-pyridyl)-2H-1,4-benzodiazepin-2-one (prepared as in J. Pharm. Sci. 53, 264) in 400 ml. of dry pyridine is heated in an oil bath, under nitrogen, with 5.05 g. of phosphorus pentasulfide at between about 110 to 120° C. for about 1 hour, cooled and concentrated under vacuum. Pyridine remaining in the residue is removed by the successive addition of xylene and toluene with vacuum concentration after each addition of solvent. The dark brown solid residue is triturated with a mixture of aqueous sodium carbonate solution and chloroform and the resulting finely divided tan solid is collected by filtration, washed with water, dissolved in a mixture of chloroform and ethanol, decolorized with activated carbon and crystallized to yield 3.39 g. of product melting at 249° C. (with decomposition) and 0.559 g. melting at 243° C. (with decomposition). The analytical sample is crystallized from ethanol to give pure 7-bromo-1,3-dihydro-5-(2-pyridyl)-2H-1,4-benzodiazepine-2-thione, with a melting point of 245 to 246° C. (with decomposition) and ultraviolet spectrum (ethanol) which had end absorption, $\lambda_{max}$. 219 m$\mu$ ($\epsilon$=21,050), $\lambda_{max}$. 302 m$\mu$ ($\epsilon$=24,100).

Analysis.—Calcd. for $C_{14}H_{20}BrN_3S$ (percent): C, 50.61; H, 3.03; Br, 24.06; N, 12.65; S, 9.65. Found (percent): C, 49.98; H, 2.73; Br, 24.31; N, 12.60; S, 9.59.

PREPARATION 2

7-chloro-1,3-dihydro-5-methyl-2H-1,4-benzodiazepine-2-thione

To a solution of 1 g. (5 mmoles) of 7-chloro-1,3-dihydro-5-methyl-2H-1,4-benzodiazepin-2-one (prepared as in French Patent 1,391,752) in 150 ml. of xylene, 1.1 g. (5 mmoles) of phosphorus pentasulfide is added. The mixture is heated under reflux in a nitrogen atmosphere for about 4 hours. The reaction mixture is cooled and filtered, with the filtrate containing only a small amount of material. The filtered solid is treated with hot water and filtered again. The filtrate is treated with 20% sodium hydroxide to give a pH of 6 to 8 and the white solid removed by extraction with ethyl acetate to give 129 mg. of crude product. The initial solid is again treated with water, the aqueous phase made basic with sodium bicarbonate and then extracted with hot ethyl acetate to give 1 g. of brown solid. This material plus the 129 mg. of crude product are chromatographed on 130 g. of silica gel using 50% ethyl acetate: 50% cyclohexane as eluting solvent. The product taken from the column is recrystallized from ethyl acetate to give 455 mg. of product, having a melting point of 205 to 206° C. (with decomposition). A previously prepared sample of the product, 7-chloro-1,3-dihydro - 5 - methyl-2H-1,4-benzodiazepine-2-thione, melts at 201 to 203° C. and gives the analysis that follows.

Analysis.—Calcd. for $C_{10}H_9ClN_2S$ (percent): C, 53.45; H, 4.04; N, 12.47; Cl, 15.78; S, 14.27. Found (percent): C, 53.29; H, 3.87; N, 12.16; Cl, 15.88; S, 14.67.

Following the procedure of Preparations 1 and 2 but substituting other known representative 2H-1,4-benzodiazepin-2-ones such as:

(1) 7-bromo-1,3-dihydro-5-ethyl-2H-1,4-benzodiazepin-2-one,
(2) 9-chloro-1,3-dihydro-3-methyl-5-propyl-2H-1,4-benzodiazepin-2-one,
(3) 1,3-dihydro-5-(4-pyridyl)-9-trifluoromethyl-2H-1,4-benzodiazepin-2-one,
(4) 7-diethylamino-1,3-dihydro-9-ethoxy-3-methyl-5-(3-pyridyl)-2H-1,4-benzodiazepin-2-one,
(5) 1,3-dihydro-7-ethoxy-5-(2-pyrryl)-2H-1,4-benzodiazepin-2-one,
(6) 1,3-dihydro-8-ethylthio-9-nitro-5-(2-pyrimidyl)-2H-1,4-benzodiazepin-2-one,
(7) 7-chloro-1,3-dihydro-5-(2-pyridyl)-2H-1,4-benzodiazepin-2-one,
(8) 1,3-dihydro-2-ethyl-7-fluoro-5-(2-furyl)-9-methylthio-2H-1,4-benzodiazepin-2-one,
(9) 1,3-dihydro-7-ethyl-5-(3-furyl)-8-propoxy-2H-1,4-benzodiazepin-2-one,
(10) 7-bromo-1,3-dihydro-9-dimethylamino-5-(2-pyrryl)-2H-1,4-benzodiazepin-2-one,
(11) 1,3-dihydro-8-nitro-5-(2-thienyl)-9-trifluoro-methyl-2H-1,4-benzodiazepin-2-one,
(12) 7-chloro-1,3-dihydro-5-(1-propenyl)-3-propyl-2H-1,4-benzodiazepin-2-one,
(13) 1,3-dihydro-5-isopropenyl-7-methoxy-2H-1,4-benzodiazepin-2-one,
(14) 7-bromo-1,3-dihydro-5-vinyl-2H-1,4-benzodiazepin-2-one,
(15) 5-cyclopentyl-7-diethylamino-1,3-dihydro-9-fluoro-2H-1,4-benzodiazepin-2-one,
(16) 5-cyclohexyl-1,3-dihydro-3-ethyl-7-methoxy-2H-1,4-benzodiazepin-2-one,

(17) 5-cycloheptyl-1,3-dihydro-7-ethoxy-3-propyl-2H-1,4-benzodiazepin-2-one,
(18) 7-bromo-1,3-dihydro-5-(1-cyclopentenyl)-8-propoxy-2H-1,4-benzodiazepin-2-one,
(19) 8-chloro-1,3-dihydro-5-(1-cyclohexenyl)-7-diethylamino-3-methyl-2H-1,4-benzodiazepin-2-one,
(20) 1,3-dihydro-5-(1-cycloheptenyl)-7-ethylthio-8-fluoro-3-propyl-2H-1,4-benzodiazepin-2-one, and the like yields, respectively, (1) 7-bromo-1,3-dihydro-5-ethyl-2H-1,4-benzodiazepine-2-thione,
(2) 9-chloro-1,3-dihydro-3-methyl-5-propyl-2H-1,4-benzodiazepine-2-thione,
(3) 1,3-dihydro-5-(4-pyridyl)-9-trifluoromethyl-2H-1,4-benzodiazepine-2-thione,
(4) 7-diethylamino-1,3-dihydro-9-ethoxy-3-methyl-5-(3-pyridyl)-2H-1,4-benzodiazepine-2-thione,
(5) 1,3-dihydro-7-ethoxy-5-(2-pyrryl)-2H-1,4-benzodiazepine-2-thione,
(6) 1,3-dihydro-8-ethylthio-9-nitro-5-(2-pyrimidyl)-2H-1,4-benzodiazepine-2-thione,
(7) 7-chloro-1,3-dihydro-5-(2-pyridyl)-2H-1,4-benzodiazepine-2-thione,
(8) 1,3-dihydro-3-ethyl-7-fluoro-5-(2-furyl)-9-methylthio-2H-1,4-benzodiazepine-2-thione,
(9) 1,3-dihydro-7-ethyl-5-(3-furyl)-8-propoxy-2H-1,4-benzodiazepine-2-thione,
(10) 7-bromo-1,3-dihydro-9-dimethylamino-5-(2-pyrryl)-2H-1,4-benzodiazepine-2-thione,
(11) 1,3-dihydro-8-nitro-5-(2-thienyl)-9-trifluoromethyl-2H-1,4-benzodiazepine-2-thione,
(12) 7-chloro-1,3-dihydro-5-(1-propenyl)-3-propyl-2H-1,4-benzodiazepine-2-thione,
(13) 1,3-dihydro-5-isopropenyl-7-methoxy-2H-1,4-benzodiazepine-2-thione,
(14) 7-bromo-1,3-dihydro-5-vinyl-2H-1,4-benzodiazepine-2-thione,
(15) 5-cyclopentyl-7-diethylamino-1,3-dihydro-9-fluoro-2H-1,4-benzodiazepine-2-thione,
(16) 5-cyclohexyl-1,3-dihydro-3-ethyl-7-methoxy-2H-1,4-benzodiazepine-2-thione,
(17) 5-cycloheptyl-1,3-dihydro-7-ethoxy-3-propyl-2H-1,4-benzodiazepine-2-thione,
(18) 7-bromo-1,3-dihydro-5-(1-cyclopentenyl)-8-propoxy-2H-1,4-benzodiazepine-2-thione,
(19) 8-chloro-1,3-dihydro-5-(1-cyclohexenyl)-7-diethylamino-3-methyl-2H-1,4-benzodiazepine-2-thione,
(20) 1,3-dihydro-5-(1-cycloheptenyl)-7-ethylthio-8-fluoro-3-propyl-2H-1,4-benzodiazepine-2-thione, and the like.

PREPARATION 3

8-bromo-6-(2-pyridyl)-4H-s-triazolo-[4,3-a][1,4]benzodiazepine-1-acetonitrile

A mixture of 6 g. of 7-bromo-1,3-dihydro-2H-1,4-benzodiazepine-2-thione (obtained as in Preparation 1), 6 g. of cyanoacetic acid hydrazide and 300 ml. of n-butyl alcohol is refluxed for about 8 hours with a slow stream of nitrogen bubbling through it. The mixture is then concentrated under vacuum and the resulting residue suspended in water and extracted with methylene chloride. The extract is dried and concentrated and the resulting residue chromatographed on a 400 g. column of silica gel (silicic acid), and eluted with 2% methanol-98% chloroform. The product eluted from the column is crystallized from ethyl acetate-Skellysolve B (hexanes) to give 8-bromo - 6 - (2 - pyridyl) - 4H - s - triazolo[4,3 - a][1,4]benzodiazepine-1-acetonitrile.

Following the procedure of Preparation 3 but substituting other representative 1,3-dihydro-2H-1,4-benzodiazepine-2-thiones such as:

(1) 7-chloro-1,3-dihydro-5-ethyl-2H-1,4-benzodiazepine-2-thione,
(2) 9-bromo-1,3-dihydro-3,5-dimethyl-2H-1,4-benzodiazepine-2-thione,
(3) 1,3-dihydro-5-(4-pyridyl)-8-trifluoromethyl-2H-1,4-benzodiazepine-2-thione,
(4) 7,9-diethoxy-1,3-dihydro-8-dimethylamino-3-ethyl-5-(3-pyridyl)-2H-1,4-benzodiazepine-2-thione,
(5) 1,3-dihydro-7-methoxy-5-(2-pyrryl)-2H-1,4-benzodiazepine-2-thione,
(6) 1,3-dihydro-8-propylthio-9-nitro-5-(2-pyrimidyl)-2H-1,4-benzodiazepine-2-thione,
(7) 7-chloro-1,3-dihydro-3-ethyl-8-fluoro-5-(2-furyl)-9-propylthio-2H-1,4-benzodiazepine-2-thione,
(8) 1,3-dihydro-8-ethyl-5-(3-furyl)-9-methoxy-2H-1,4-benzodiazepine-2-thione,
(9) 7-chloro-1,3-dihydro-9-diethylamino-5-(2-pyrryl)-2H-1,4-benzodiazepine-2-thione,
(10) 1,3-dihydro-9-nitro-5-(2-thienyl)-8-trifluoromethyl-2H-1,4-benzodiazepine-2-thione,
(11) 7-bromo-1,3-dihydro-5-(1-propenyl)-3-propyl-2H-1,4-benzodiazepine-2-thione,
(12) 1,3-dihydro-5-isopropenyl-7-methoxy-2H-1,4-benzodiazepine-2-thione,
(13) 7-chloro-1,3-dihydro-8-ethoxy-5-vinyl-2H-1,4-benzodiazepine-2-thione,
(14) 5-cyclopentyl-7-diethylamino-1,3-dihydro-2H-1,4-benzodiazepine-2-thione,
(15) 5-cycloheptyl-1,3-dihydro-7-methoxy-3-methyl-2H-1,4-benzodiazepine-2-thione,
(16) 7-chloro-1,3-dihydro-5-(1-cyclopentenyl)-8-ethoxy-2H-1,4-benzodiazepine-2-thione,
(17) 1,3-dihydro-5-(1-cycloheptenyl)-3,8-dimethyl-7-methylthio-2H-1,4-benzodiazepine-2-thione, and the like, yields, respectively, (1) 8-chloro-6-ethyl-4H-s-triazolo[4,3-a][1,4]benzodiazepine-1-acetonitrile,
(2) 10-bromo-4,6-dimethyl-4H-s-triazolo[4,3-a][1,4]benzodiazepine-1-acetonitrile,
(3) 6-(4-pyridyl)-9-trifluoromethyl-4H-s-triazolo-[4,3-a][1,4]benzodiazepine-1-acetonitrile,
(4) 8,10-diethoxy-9-dimethylamino-4-ethyl-6-(3-pyridyl)-4H-s-triazolo[4,3-a][1,4]benzodiazepine-1-acetonitrile,
(5) 8-methoxy-6-(2-pyrryl)-4H-s-triazolo[4,3-a][1,4]benzodiazepine-1-acetonitrile,
(6) 9-propylthio-10-nitro-6-(2-pyrimidyl)-4H-s-triazolo[4,3-a][1,4]benzodiazepine-1-acetonitrile,
(7) 8-chloro-4-ethyl-9-fluoro-6-(2-furyl)-10-propylthio-4H-s-triazolo[4,3-a][1,4]benzodiazepine-1-acetonitile,
(8) 9-ethyl-6-(3-furyl)-10-methoxy-4H-s-triazolo[4,3-a][1,4]benzodiazepine-1-acetonitrile,
(9) 8-chloro-10-diethylamino-6-(2-pyrryl)-4H-s-triazolo[4,3-a][1,4]benzodiazepine-1-acetontrile,
(10) 10-nitro-6-(2-thienyl)-9-trifluoromethyl-4H-s-triazolo[4,3-a][1,4]benzodiazepine-1-acetonitrile,
(11) 8-bromo-6-(1-propenyl)-4-propyl-4H-s-triazolo-[4,3-a][1,4]benzodiazepine-1-acetonitrile,
(12) 6-isopropentyl-8-methoxy-4H-s-triazolo[4,3-a][1,4]benzodiazepine-1-acetonitrile,
(13) 8-chloro-9-ethoxy-6-vinyl-4H-s-triazolo[4,3-a][1,4]benzodiazepine-1-acetonitrile,
(14) 6-cyclopentyl-8-diethylamino-4H-s-triazolo[4,3-a][1,4]benzodiazepin-1-acetonitrile,
(15) 6-cycloheptyl-8-methoxy-4-methyl-4H-s-triazolo-[4,3-a][1,4]benzodiazepine-1-acetonitrile,
(16) 8-chloro-6-(1-cyclopentenyl)-9-ethoxy-4H-s-triazolo[4,3-a][1,4]benzodiazepine-1-acetonitrile,
(17) 6-(1-cycloheptenyl)-4,9-dimethyl-8-methylthio-4H-s-triazolo[4,3-a][1,4]benzodiazepine-1-acetonitrile, and the like.

EXAMPLE 1

8-bromo-6-(2-pyridyl)-4H-s-triazolo[4,3-a][1,4]benzodiazepine-1-acetic acid methyl ester (I)

A stirred mixture of 1 g. of 8-bromo-6-(2-pyridyl)-4H-s-triazolo[4,3-a][1,4]benzodiazepine - 1 - acetonitrile (obtained as in Preparation 3), 2 ml. of methanol and 6 ml. of ether, is cooled in a salt-ice bath and saturated with a stream of anhydrous hydrogen chloride for about 15 minutes. The mixture is allowed to warm slowly to room temperature, stand for about 18 hours, and then poured into water. This mixture is neutralized with sodium bicarbonate and then extracted with chloroform. The extract is washed with brine, dried over anhydrous magnesium sulfate and then concentrated. The resulting residue is crystallized from methanol to yield a by-product, 1-(aminomethyl)-7-bromo-5-(2-pyridyl)-s-triazolo[4,3 - a][1,4]quinoline-4-carboxylic acid methyl ester. The mother liquor from this crystallization is concentrated and chromatographed on a 50 g. column of silica gel with 2% methanol-98% chloroform, which on elution yields 8-bromo-6-(2-pyridyl)-4H-s - triazolo[4,3 - a][1,4]benzodiazepine-1-acetic acid methyl ester (1).

Following the procedure of Example 1 but substituting other representative 6-substituted-4H-s-triazolo[4,3-a][1,4]benzodiazepine-1-acetonitriles, such as:

(1) 8-fluoro-6-methyl-4H-s-triazolo[4,3-a][1,4]benzodiazepine-1-acetonitrile,
(2) 9-bromo-4,6-diethyl-4H-s-triazolo[4,3-a][1,4]benzodiazepine-1-acetonitrile,
(3) 6-(4-pyridyl)-8-trifluoromethyl-4H-s-triazolo-[4,3-a][1,4]benzodiazepine-1-acetonitrile,
(4) 9-ethoxy-6-(2-pyrryl)-4H-s-triazolo[4,3-a][1,4]benzodiazepine-1-acetonitrile,
(5) 8-propylthio-9-nitro-6-(2-pyrimidyl)-4H-s-triazolo[4,3-a][1,4]benzodiazepine-1-acetonitrile,
(6) 8-ethyl-6-(2-furyl)-10-methoxy-4H-s-triazolo[4,3-a][1,4]benzodiazepine-1-acetonitrile,
(7) 9-chloro-8-nitro-6-(2-thienyl)-10-trifluoromethyl-4H-s-triazolo[4,3-a][1,4]benzodiazepine-1-acetonitrile,
(8) 8-chloro-10-diethylamino-6-(1-propenyl)-4-propyl-4H-s-triazolo[4,3-a][1,4]benzodiazepine-1-acetonitrile,
(9) 8-bromo-10-ethoxy-6-vinyl-4H-s-triazolo[4,3-a][1,4]benzodiazepine-1-acetonitrile,
(10) 6-cyclohexyl-8-diethylamino-10-ethoxy-4-ethyl-4H-s-triazolo[4,3-a][1,4]benzodiazepine-1-acetonitrile,
(11) 8-bromo-6-(1-cycloheptenyl)-4,10-dimethyl-9-ethylthio-4H-s-triazolo[4,3-a][1,4]benzodiazepine-1-acetonitrile, and the like, yields, respectively,
(1) 8-fluoro-6-methyl-4H-s-triazolo[4,3-a][1,4]benzodiazepine-1-acetic acid methyl ester (I),
(2) 9-bromo-4,6-diethyl-4H-s-triazolo[4,3-a][1,4]benzodiazepine-1-acetic acid methyl ester (I),
(3) 6-(4-pyridyl)-8-trifluoromethyl-4H-s-triazolo[4,3-a][1,4]benzodiazepine-1-acetic acid methyl ester (I),
(4) 9-ethoxy-6-(2-pyrryl)-4H-s-triazolo[4,3-a][1,4]benzodiazepine-1-acetic acid methyl ester (I),
(5) 8-propylthio-9-nitro-6-(2-pyrimidyl)-4H-s-triazolo[4,3-a][1,4]benzodiazepine-1-acetic acid methyl ester (I),
(6) 8-ethyl-6-(2-furyl)-10-methoxy-4H-s-triazolo[4,3-a][1,4]benzodiazepine-1-acetic acid methyl ester (I),
(7) 9-chloro-8-nitro-6-(2-thienyl)-10-trifluoromethyl-4H-s-triazolo[4,3-a][1,4]benzodiazepine-1-acetic acid methyl ester (I),
(8) 8-chloro-10-diethylamino-6-(1-propenyl)-4-propyl-4H-s-triazolo[4,3-a][1,4]benzodiazepine-1-acetic acid methyl ester (I),
(9) 8-bromo-10-ethoxy-6-vinyl-4H-s-triazolo[4,3-a][1,4]benzodiazepine-1-acetic acid methyl ester (I),
(10) 6-cyclohexyl-8-diethylamino-10-ethoxy-4-ethyl-4H-s-triazolo[4,3-a][1,4]benzodiazepine-1-acetic acid methyl ester (I),
(11) 8-bromo-6-(1-cycloheptenyl)-4,10-dimethyl-9-ethylthio-4H-s-triazolo[4,3-a][1,4]benzodiazepine-1-acetic acid methyl ester (I), and the like.

Following the procdures of the immediately preceding paragraph and Example 1, but substituting for the methanol employed in Example 1, another lower alkanol such as ethanol, propanol or isopropanol, yields the corresponding 1-acetic acid lower alkyl esters (I) prepared therein, e.g., the 6-substituted-4H-s-triazolo[4,3-a][1,4]benzodiazepine-1-acetic acid ethyl, propyl or isopropyl of esters of Formula I.

EXAMPLE 2

8-bromo-N,N-dimethyl-6-(2-pyridyl)-4H-s-triazolo-[4,3-a][1,4]benzodiazepine-1-acetamide (II)

A suspension of 0.4 g. of 8-bromo-6-(2-pyridyl)-4H-s-triazolo[4,3-a][1,4]benzodiazepine-1-acetic acid methyl ester (I) (prepared as in Example 1) in 5 ml. of 25% aqueous dimethylamine and 6 ml. of dimethylformamide is treated with 82 ml. of dimethylamine hydrochloride and stirred under nitrogen at room temperature for about 18 hours. It is poured into cold water, saturated with sodium chloride and extracted with methylene chloride. The extract is washed with dilute sodium chloride solution, dried over anhydrous potassium carbonate and concentrated under vacuum. The resulting residue is treated successively with xylene and toluene; concentrating after each addition. The resulting material is crystallized from methanol-ethyl acetate to give 8-bromo-N,N-dimethyl-6-(2-pyridyl)-4H-s-triazolo[4,3 - a][1,4]benzodiazepine-1-acetamide (II).

Following the procedure of Example 2, but substituting another 6-substituted-4H-s-triazolo[4,3-a][1,4]benzodiazepine-1-acetic acid methyl (or other alkyl) ester (I) as starting material, and dimethylamine (or another lower dialkylamine) or a lower N-heterocyclicamine, such as:

(1) 8-bromo-6-ethyl-4H-s-triazolo[4,3-a][1,4]benzodiazepine-1-acetic acid methyl ester (I) and dimethylamine,
(2) 10-chloro-4-ethyl-6-methyl-4H-s-triazolo[4,3-a][1,4]benzodiazepine-1-acetic acid ethyl ester (I) and diethylamine,
(3) 6-(3-pyridyl)-9-trifluoromethyl-4H-s-triazolo-[4,3-a][1,4]benzodiazepine-1-acetic acid propyl ester (I) and dipropylamine,
(4) 9-methoxy-6-(2-pyrryl)-4H-s-triazolo[4,3-a][1,4]benzodiazepine-1-acetic acid methyl ester (I) and diisopropylamine,
(5) 8-ethylthio-10-nitro-6-(2-pyrimidyl)-4H-s-triazolo-[4,3-a][1,4]benzodiazepine-1-acetic acid ethyl ester (I) and pyrrolidine,
(6) 8-bromo-6-(2-furyl)-9-methoxy-4H-s-triazolo-[4,3-a][1,4]benzodiazepine-1-acetic acid methyl ester (I) and pyrrolidine,
(7) 9-chloro-10-nitro-6-(2-thienyl)-8-trifluoromethyl-4H-s-triazolo[4,3-a][1,4]benzodiazepine-1-acetic acid ethyl ester (I) and piperidine,
(8) 8-bromo-10-dimethylamino-6-(1-propenyl)-4H-s-triazolo[4,3-a][1,4]benzodiazepine-1-acetic acid ethyl ester (I) and hexamethyleneimine,
(9) 6-(1-cyclohexenyl)-9-dimethylamino-4-ethyl-8-propoxy-4H-s-triazolo[4,3-a][1,4]benzodiazepine-1-acetic acid propyl ester (I) and morpholine, and the like, yields, respectively, (1) 8-bromo-N,N-dimethyl-6-ethyl-4H-s-triazolo-[4,3-a][1,4]benzodiazepine-1-acetamide (II),
(2) 10-chloro-N,N-diethyl-4-ethyl-6-methyl-4H-s-triazolo[4,3-a][1,4]benzodiazepine-1-acetamide (II),
(3) N,N-dipropyl-6-(3-pyridyl)-9-trifluoromethyl-4H-s-triazolo[4,3-a][1,4]benzodiazepine-1-acetamide (II),
(4) N,N-diisopropyl-9-methoxy-6-(2-pyrryl)-4H-s-triazolo[4,3-a][1,4]benzodiazepine-1-acetamide (II),
(5) 8-ethylthio-10-nitro-6-(2-pyrimidyl)-N,N-tetramethylene-4H-s-triazolo[4,3-a][1,4]benzodiazepine-1-acetamide (II),
(6) 8-bromo-6-(2-furyl)-9-methoxy-N,N-tetramethylene-4H-s-triazolo[4,3-a][1,4]benzodiazepine-1-acetamide (II),
(7) 9-chloro-10-nitro-N,N-pentamethylene-6-(2-thienyl)-8-trifluoromethyl-4H-s-triazolo[4,3-a][1,4]benzodiazepine-1-acetamide (II),
(8) 8-bromo-10-dimethylamino-N,N-hexamethylene-6-(1-propenyl)-4H-s-triazolo[4,3-a][1,4]benzodiazepine-1-acetamide (II),
(9) 4-{[6-(1-cyclohexenyl)-9-dimethylamino-4-ethyl-8-propoxy-4H-s-triazolo[4,3-a][1,4]benzodiazepin-1-yl]acetyl}morpholine (II), and the like.

EXAMPLE 3

8 - bromo - 5,6 - dihydro - 1 - [2 - (dimethylamino)ethyl]- 6 - (2 - pyridyl) - 4H - s - triazolo[4,3 - a][1,4 - benzodiazepine (III)

A tetrahydrofuran solution of 1.5 g. of 8-bromo-N,N-dimethyl-6-(2-pyridyl)-4H - s - triazolo[4,3 - a][1,4]benzodiazepine-1-acetamide (II) (prepared as in Example 2) is slowly added to a solution of borane in tetrahydrofuran. The mixture is heated to about 40° C. and kept at about this temperature for about 15 hours. The solvent of the mixture is then evaporated under vacuum and the residue is dissolved in dilute hydrochloric acid, neutralized with dilute sodium hydroxide and extracted with chloroform. The chloroform extract is dried over anhydrous potassium carbonate, then evaporated to dryness and the residue recrystallized twice to give 8-bromo-5,6-dihydro - 1 - [2-(dimethylamino)ethyl]-6-(2-pyridyl)-4H-s-triazolo[4,3-a][1,4]benzodiazepine (III).

Following the procedure of Example 3, but substituting other 6-substituted-4H-s-triazolo[4,3-a][1,4]benzodiazepine-1-acetamides (II) as starting material, such as:

(1) 8-chloro-N,N-dimethyl-6-propyl-4H-s-triazolo-[4,3-a][1,4]benzodiazepine-1-acetamide (II),
(2) 9-bromo-N,N-dimethyl-4-ethyl-6-methyl-4H-s-triazolo[4,3-a][1,4]benzodiazepine-1-acetamide (II),
(3) N,N-diethyl-6-(4-pyridyl)-8-trifluoromethyl-4H-s-triazolo[4,3-a][1,4]benzodiazepine-1-acetamide (II),
(4) N,N-dipropyl-8-fluoro-6-(2-furyl)-10-methoxy-4H-s-triazolo[4,3-a][1,4]benzodiazepine-1-acetamide (II),
(5) N,N-diisopropyl-9-ethoxy-4-ethyl-6-(2-pyrryl)-4H-s-triazolo[4,3-a][1,4]benzodiazepine-1-acetamide (II),
(6) 10-nitro-8-propylthio-6-(2-pyrimidyl)-N,N-tetramethylene-4H-s-triazolo[4,3-a][1,4]benzodiazepine-1-acetamide (II),
(7) 8-bromo-N,N-tetramethylene-6-(2-thienyl)-4H-s-triazolo[4,3-a][1,4]benzodiazepine-1-acetamide (II),
(8) 8-chloro-9-nitro-N,N-pentamethylene-6-vinyl-4H-s-triazolo[4,3-a][1,4]benzodiazepine-1-acetamide (II),
(9) 9-bromo-6-cyclopentyl-10-diethylamino-N,N-hexamethylene-4H-s-triazolo[4,3-a][1,4]benzodiazepine-1-acetamide (II),
(10) 4-{[6-(1-cycloheptenyl)-9-dipropylamino-4-methyl-8-propoxy-4H-s-triazolo[4,3-a][1,4]benzodiazepine-1-yl]acetyl}morpholine (II), and the like, yields, respectively, (1) 8-chloro-5,6-dihydro-1-[2-(dimethylamino)ethyl]-6-propyl-4H-s-triazolo[4,3-a][1,4]benzodiazepine (III),
(2) 9-bromo-5,6-dihydro-1-[2-(dimethylamino)ethyl]-4-ethyl-6-methyl-4H-s-triazolo[4,3-a][1,4]benzodiazepine (III),
(3) 5,6-dihydro-1-[2-(diethylamino)ethyl]-6-(4-pyridyl)-8-trifluoromethyl-4H-s-triazolo[4,3-a][1,4]benzodiazepine (III),
(4) 1-[2-(dipropylamino)ethyl]-5,6-dihydro-8-fluoro-6-(2-furyl)-10-methoxy-4H-s-triazolo[4,3-a][1,4]benzodiazepine (III),
(5) 5,6-dihydro-1-[2-(diisopropylamino)ethyl]-9-ethoxy-4-ethyl-6-(2-pyrryl)-4H-s-triazolo[4,3-a][1,4]benzodiazepine (III),
(6) 5,6-dihydro-10-nitro-8-propylthio-6-(2-pyrimidyl)-1-(2-pyrrolidinoethyl)-4H-s-triazolo[4,3-a][1,4]benzodiazepine (III),
(7) 8-bromo-5,6-dihydro-1-(2-pyrrolidinoethyl)-6-(2-thienyl)-4H-s-triazolo[4,3-a][1,4]benzodiazepine (III),
(8) 8-chloro-5,6-dihydro-9-nitro-1-(2-piperidinoethyl)-6-vinyl-4H-s-triazolo[4,3-a][1,4]benzodiazepine (III),
(9) 9-bromo-6-cyclopentyl-10-diethylamino-5,6-dihydro-1-[2-(hexamethyleneimino)ethyl]-4H-s-triazolo[4,3-a][1,4]benzodiazepine (III),
(10) 6-(1-cycloheptenyl)-5,6-dihydro-9-dipropylamino-4-methyl-1-(2-morpholinoethyl)-8-propoxy-4H-s-triazolo[4,3-a][1,4]benzodiazepine (III), and the like.

Following the procedures of the immediately preceding paragraph and Example 3, but substituting lithium aluminum hydride for the borane employed in Example 3, also yields the 5,6-dihydro compounds (III) produced in the aforesaid paragraph and example.

EXAMPLE 4

8-bromo-1-[2-(dimethylamino)ethyl]-6-(2-pyridyl)-4H-s-triazolo[4,3-a][1,4]benzodiazepine (IV)

A stirred suspension of 8-bromo-5,6-dihydro-1-[2-(dimethylamino)ethyl] - 6 - (2 - pyridyl)-4H-s-triazolo[4,3-a][1,4]benzodiazepine (III) (prepared as in Example 3) and diethyl azodicarboxylate in benzene is heated to reflux and kept at this temperature for about 15 hours. The mixture is then cooled, the solvent evaporated and the resulting residue suspended in water and extracted with chloroform. The chloroform extracts are dried with anhydrous potassium carbonate, evaporated and the resulting residue crystallized twice from ethyl acetate to give 8-bromo-1-[2 - (dimethylamino)ethyl] - 6 - (2 - pyridyl)-4H-s-triazolo[4,3-a][1,4]benzodiazepine (IV).

Following the procedure of Example 4 but substituting another 1-{2-[lower dialkyl(or polymethylene)amino]ethyl} - 5,6 - dihydro - 6 - substituted-4H-s-triazolo[4,3-a][1,4]benzodiazepine (III) as starting material, such as:

(1) 8-bromo-5,6-dihydro-1-[2-(dimethylamino)ethyl]-6-methyl-4H-s-triazolo[4,3-a][1,4]benzodiazepine (III),
(2) 9-chloro-5,6-dihydro-1-[2-(dimethylamino)ethyl]-4-methyl-6-propyl-4H-s-triazolo[4,3-a][1,4]benzodiazepine (III),
(3) 5,6-dihydro-1-[2-(diethylamino)ethyl]-6-(3-pyridyl)-8-propylthio-4H-s-triazolo[4,3-a][1,4]benzodiazepine (III),
(4) 1-[2-(dipropylamino)ethyl]-5,6-dihydro-8-ethoxy-10-fluoro-6-(2-furyl)-4H-s-triazolo[4,3-a][1,4]benzodiazepine (III),
(5) 5,6-dihydro-1-[2-(diisopropylamino)ethyl]-8,9-dimethoxy-4-ethyl-6-(2-pyrryl)-4H-s-triazolo[4,3-a][1,4]benzodiazepine (III),
(6) 5,6-dihydro-10-fluoro-8-nitro-6-(2-pyrimidyl)-1-(2-pyrrolidinoethyl)-4H-s-triazolo[4,3-a][1,4]benzodiazepine (III),
(7) 8-chloro-5,6-dihydro-1-(2-pyrrolidinoethyl)-6-(2-thienyl)-4H-s-triazolo[4,3-a][1,4]benzodiazepine (III),
(8) 9-chloro-5,6-dihydro-8-nitro-1-(2-piperidinoethyl)-6-(1-propenyl)-4H-s-triazolo[4,3-a][1,4]benzodiazepine (III),
(9) 8-bromo-6-cyclohexyl-10-diethylamino-5,6-dihydro-1-[2-(hexamethyleneimino)ethyl]-4H-s-triazolo[4,3-a][1,4]benzodiazepine (III),
(10) 6-(1-cyclopentenyl)-5,6-dihydro-8-ethylthio-10-methoxy-4-methyl-1-(2-morpholinoethyl)-4H-s-triazolo[4,3-a][1,4]benzodiazepine (II), and the like, yields, respectively, (1) 8-bromo-1-[2-(dimethylamino)ethyl]-6-methyl-4H-s-triazolo[4,3-a][1,4]benzodiazepine (IV),
(2) 9-chloro-1-[2-(dimethylamino)ethyl]-4-methyl-6-propyl-4H-s-triazolo[4,3-a][1,4]benzodiazepine (IV),
(3) 1-[2-(diethylamino)ethyl]-6-(3-pyridyl)-8-propylthio-4H-s-triazolo[4,3-a][1,4]benzodiazepine (IV),
(4) 1-[2-(dipropylamino)ethyl]-8-ethoxy-10-fluoro-6-(2-furyl)-4H-s-triazolo[4,3-a][1,4]benzodiazepine (IV),
(5) 1-[2-(diisopropylamino)ethyl]-8,9-dimethoxy-4-ethyl-6-(2-pyrryl)-4H-s-triazolo[4,3-a][1,4]benzodiazepine (IV),
(6) 10-fluoro-8-nitro-6-(-pyrimidyl)-1-(-pyrrolidinoethyl)-4H-s-triazolo[4,3-a][1,4]benzodiazepine (IV),
(7) 8-chloro-1-(2-pyrrolidinoethyl)-6-(2-thienyl)-4H-s-triazolo[4,3-a][1,4]benzodiazepine (IV),
(8) 9-chloro-8-nitro-1-(2-piperidinoethyl)-6-(1-propenyl)-4H-s-triazolo[4,3-a][1,4]benzodiazepine (IV),
(9) 8-bromo-6-cyclohexyl-10-diethylamino-1-[2-(hexamethyleneimino)ethyl]-4H-s-triazolo[4,3-a][1,4]benzodiazepine (IV),
(10) 6-(1-cyclopentenyl)-8-ethylthio-10-methoxy-4-methyl-1-(2-morpholinomethyl)-4H-s-triazolo[4,3-a][1,4]benzodiazepine (IV), and the like.

Following the procedures of the immediately preceding paragraph and Example 4, but substituting activated manganese dioxide, ruthenium dioxide or DDQ for the diethyl azodicarboxylate employed in Example 4, also yields the 1 - {2 - [lower dialkyl(or polymethylene)amino]ethyl} - 6 - substituted - 4H - s - triazolo[4,3-a]-[1,4]benzodiazepines (IV) produced in the aforesaid paragraph and example.

What is claimed is:

1. 8-bromo - N,N - dimethyl - 6 - (2 - pyridyl)-4H-s-triazolo[4,3-a][1,4]benzodiazepine-1-acetamide.
2. 8-bromo - 5,6 - dihydro - 1 - [2 - (dimethylamino)ethyl - 6 - (2 - pyridyl) - 4H - s - triazolo[4,3-a][1,4]benzodiazepine.
3. 8 - bromo - 1 - [2 - (dimethylamino)ethyl] - 6 - (2-pyridyl)-4H-s-triazolo[4,3-a][1,4]benzodiazepine.

References Cited
UNITED STATES PATENTS
3,523,947  8/1970  Derieg et al. _____ 260—256.4

OTHER REFERENCES
Ger Offen. 2,012,190, Sept. 24, 1970; Chem. Abst. 73: 109801v, 1970.
Ger Offen. 2,055,889, May 27, 1971; Chem. Abst. 75: 76853z, 1971.
Ger Offen. 2,056,174, Aug. 24, 1971; Chem. Abst. 75: 98599y, 1971.

HENRY R. JILES, Primary Examiner
G. T. TODD, Assistant Examiner

U.S. Cl. X.R.
260—247.1, 247.5 R, 256.4 R, 293.59, 296 T, 308 R, 999